United States Patent Office 3,446,188
Patented May 27, 1969

3,446,188
STEAM GENERATOR OR HEATER FOR AN ATOMIC POWER GENERATING PLANT
Masao Nozawa and Kiyoshi Sako, Ibaragi-ken, and Hiroshi Ueda, Tokyo, Japan, assignors to Japan Atomic Energy Research Institute, Minato-ku, Tokyo, and Nippon Kokkan Kabushiki Kaisha, Tokyo, Japan
Filed Jan. 3, 1967, Ser. No. 606,781
Claims priority, application Japan, Jan. 14, 1966, 41/1,936
Int. Cl. F22b 1/06
U.S. Cl. 122—32      7 Claims

ABSTRACT OF THE DISCLOSURE

A steam generator or heater using liquid metal as a heat transmission medium having both a primary side tubing for circulating the liquid metal of a heated side and a secondary side tubing for producing and heating the steam contained in the steam generator body, and the same or a different kind of liquid metal as is used on the heated side is used in the generator vessel as a heat transmission medium between the primary and secondary side tubes.

Background of the invention

This invention relates to a steam generator or heater for an atomic power generating plant, and more particularly to a steam generator or heater for atomic power generating apparatus using a liquid metal coolant.

As the liquid metal coolant in such an apparatus, a sodium or sodium potassium alloy, etc. is usually utilized. Such a plant is usually composed of at least a nuclear reactor intermediate heat exchanger, steam generator, piping system therebetween, and a turbogenerator. With this setup, in case sodium coolant is being used, the intermediate heat exchanger must be perfect; that is, if there is any flaw, for example, if by chance a steam circulating tube, etc. is damaged, radioactive sodium will diffuse out of the steam generator, and further, in some cases, hydrogen, which is a reactive product, will explode to diffuse the radioactive sodium over a wide area. Accordingly, an extra space is required for installing the intermediate heat exchanger, pump device, piping and related equipment, and the maintenance becomes complicated. Also, as sodium has a high heat transfer capacity, there is a large temperature difference, i.e., high thermal stress in the evaporating tubewall in the ordinary shell and tube type, at the same time there is a sudden change of sodium temperature on the shell side, so that their is danger that the steam side tube will break. Furthermore, in the conventional structure leading through the intermediate heat exchanger to the steam generator, since a mean temperature difference of about 30 degrees centigrade through high and low temperature parts is normally adopted from the standpoint of economic design, a large temperature loss occurs in the superheated part of the steam generator.

Inasmuch as a liquid metal has a high boiling point and is superior in heat transfer capacity at even a low flow rate or in a steady state, it is desirable to use liquid metal as a heat transmission medium in each tube of a tube and tube system. This eliminates the conventional disadvantage without need for an independent intermediate heat exchanger.

It is also advisable to omit the intermediate heat exchanger since there is no danger of steam reacting directly with the sodium on the primary side, if the steam side tube of the secondary breaks down by any chance in the steam generator. Also, omitting the intermediate heat exchanger lowers the cost of the whole apparatus, and simplifies operation and maintenance. And even though a sudden temperature change occurs in the primary side, no large thermal shock is expected to occur in the high pressure tube on the steam side. Moreover, the thermal stress is expected to decrease during operation if the temperature drop of the high pressure tube of the steam side in the part is reduced, in which case the heat flux is large like the evaporating portion, and at the same time the temperature difference of the primary side is made small and the effective temperature difference is provided to the steam side in the part in which the heat flux is small as the superheated part.

Therefore, one object of this invention is to provide a steam generator or heater for an atomic power generating plant without an independent intermediate heat exchanger.

Another object of the invention is the provision of a steam generator or heater using liquid metal as a heat transmission medium for superior heat transmission at a low flow rate or in a steady state.

A further object of the invention is to provide an inherently safe, reliable, and compact nuclear reactor plant which is simple in construction and which provides low cost power.

These and other objects and features of the present invention will be made apparent to those skilled in the art from a consideration of the following specification and claims.

Summary of the invention

In accordance with the present invention, it has been possible to adjust the temperature difference between the sodium side tube and the steam side tube by increasing or decreasing the set value in the primary side tube; also it has been possible to effect adjustment by changing the thickness of the tube or the space within the steam side tube, setting compartment wall, changing the kind of the liquid metal and as the heat transmission medium, etc. In this invention, the primary side tube is vertical and the secondary tube is of the helical type, any other proper shape beside the above can be adopted. Also, two or more nozzles can be used on the primary and secondary sides; this is useful for maintenance in case the tube or other part is broken. Furthermore, it is possible to use part of the steam side tube of the same shape for a steam heater.

If the steam side tube of the secondary breaks down by any chance in the steam generator of this invention, the intermediate heat exchanger can be neglected since there is no fear of its reacting directly with the sodium on the primary side; also it can be omitted to lower the cost of the whole apparatus, and the excess device or part can be omitted to simplify the operation and maintenance. And, even though a sudden temperature change occurs in the primary side, no large thermal shock will occur in the high pressure pipe on the steam side. This invention can be used not only as a sub-critical pressure steam generator but as a super-critical pressure steam generator; also it is effective either as a flow through type or drum type steam generator.

Description of the preferred embodiment

Figure 1:
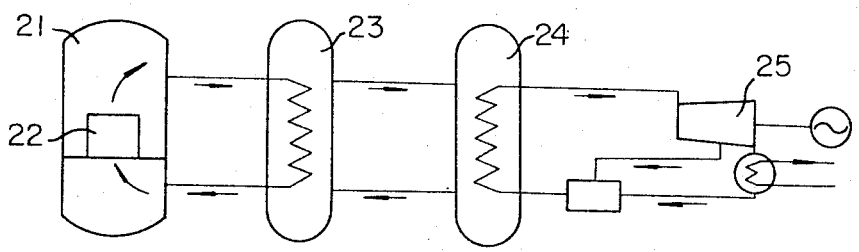
FIGURES 1 and 2 are diagrams of the conventional liquid metal cooled atomic power generating apparatus.
Figure 2:
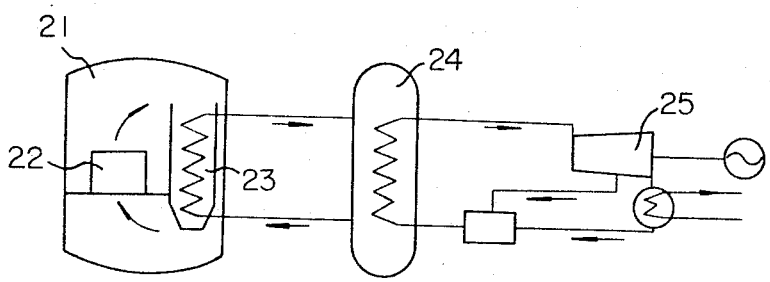

Referring now to FIGURES 1 and 2 which are diagrams of the conventional liquid metal coolant atomic power generating apparatus, reference numeral 21 as referred to in these views indicates a nuclear reactor vessel, which contains a nuclear reactor 22 and an intermediate heat exchanger 23 is connected thereto by the pipes or is contained in the reactor vessel itself (FIGURE 2). Reference numeral 24 identifies a steam generator and 25 a turbine generator.

In such a sodium cooled type, the intermediate heat exchanger 23 must be perfect; that is, if there is any flaw, for example, if by chance a steam circulating tube, etc. is damaged, radioactive sodium diffuses out of the steam generator, and further, in some cases, hydrogen, which is a reactive product, will explode to spread the radioactive sodium over a wide area. Accordingly, an extra space is required for installing the intermediate heat exchanger, pump device, piping and related equipment, and maintenance becomes complicated. Also, as sodium has high heat transfer capacity, there is a large temperature difference, i.e., high thermal stress in the evaporating tube wall in the ordinary shell and tube type, and if there is a sudden change of sodium temperature on the shell side, there is danger that the tube on the steam side will break. Furthermore, in the conventional structure leading through the intermediate heat exchanger 23 to the steam generator 24 (see FIGURES 1 and 2), a mean temperature difference of about 30° between the high and low temperature parts is normally adopted from the standpoint of economic design, so a large temperature loss occurs in the superheated part of steam generator 24 as will be hereinafter explained.

Inasmuch as a liquid metal has a high boiling point and is superior in heat transfer capacity even at a low flow rate or in a steady state, this invention utilizes liquid metal in a tube and tube system as a heat transmission medium in each tube, and eliminates the conventional disadvantages without need for an independent intermediate heat exchanger.

Figure 3:
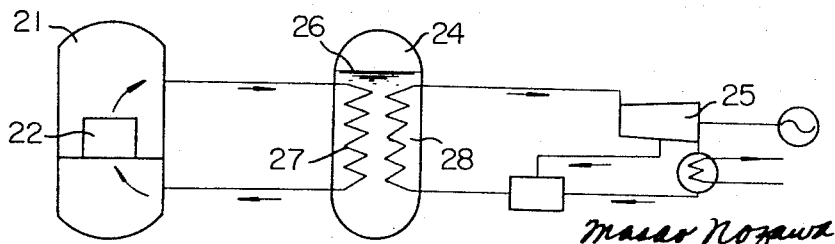
FIGURE 3 is a diagram of this invention.

As preferably seen in FIGURE 3 which is a diagram of this invention, the atomic power plant is such that sodium for cooling the nuclear reactor is circulating in the tube on the primary side 27 of the steam generator 24, and water and steam is cycled in the tube on secondary side 28. The inside of steam generator 24 is filled with sodium 26 which operates to transfer the heat from primary side 27 to the secondary side 28.

Figure 4:
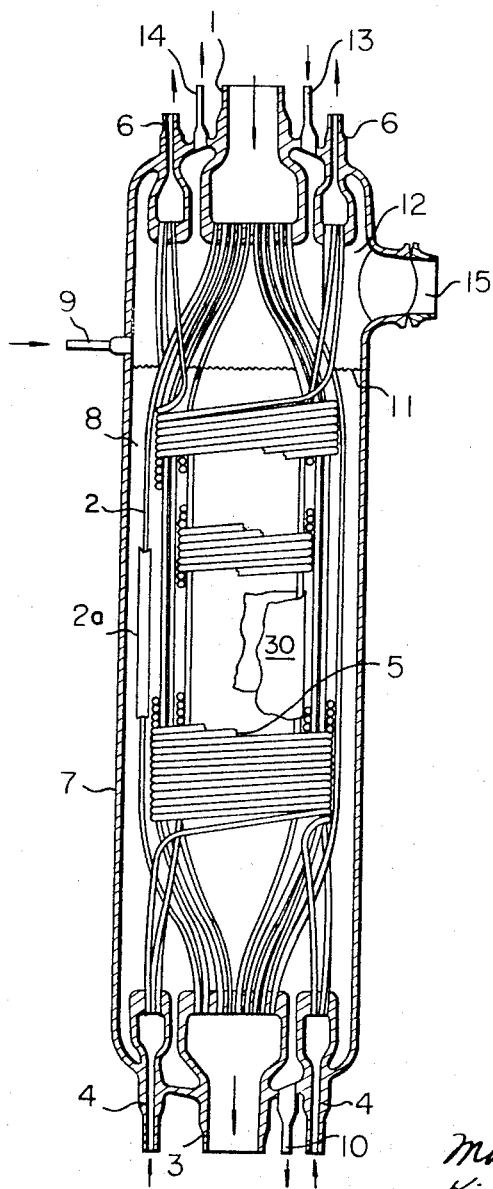
FIGURE 4 is a sectional view of the steam generator of this invention.

An embodiment of the steam generator of this invention will be hereinafter explained. FIGURE 4 shows an embodiment of flowthrough type in which radioactive sodium flows in from nozzle 1 and is discharged from nozzle 3 after flowing through a plurality of vertical tubes 2, while on the steam side, water is supplied to a nozzle 4 in the lower part and flows through a plurality of helical tubes 5 and is exhausted as superheated steam from nozzle 6 in the upper part. Sodium 8 which is to be used as the heat transmission medium flows from nozzle 9 into steam generator 7 and is discharged from nozzle 10. Sodium 8 can be kept in the steam generator body 7, or circulated in an external circuit in an appropriate amount, and the top surface 11 of the liquid can be raised, kept level or lowered in response to the load. Reference numeral 12 identifies an inert gas maintained at a proper pressure; said gas is supplied through nozzle 13 and is exhausted through nozzle 14. The above mentioned sodium 8 and inert gas 12 are effective to detect a leak in the piping, and in case a leak occurs on the primary side, radio activity is detected and in case a leak occurs on the secondary side the reactive product from the reaction of the water and sodium is detected. Number 15 identifies a rupture disc which is so constructed that when the steam pipe is broken said disc breaks to allow the steam to flow into the shell and the pressure is raised to more than the set value so that the water or steam reacts with the sodium or other. And also, in order to protect the primary or secondary tubes from shock in case of an explosion, a relatively thin protecting tube 2a is provided around the primary tube 2, or around the secondary tube (this embodiment not shown), or a compartment wall 30 is installed between the primary and secondary tube layers, so as to insure the safety of the primary and secondary tubes.

Figure 5:
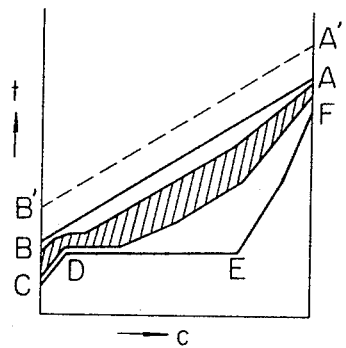
FIGURES 5 and 6 are temperature heat diagrams, FIGURE 5 showing the conventional case and FIGURE 6 the case of this invention.
Figure 6:
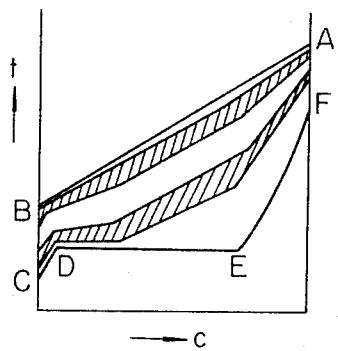

The changes in temperature-heat ratio of the steam generator according to this invention will be hereinafter explained. The conditions in a conventional apparatus are indicated in FIGURE 5, in which the dotted line shows the temperature of sodium on the nuclear reactor side, and the temperature of the inlet is indicated at A' (for example 500° C.) and the outlet is at B' (for example 350° C.). The temperature at which the sodium flows through the intermediate heat exchanger into the steam generator is indicated at point A 30° C. lower than that, and the temperature of the sodium flowing out is also at B 30° lower. On the steam side, the water is provided at temperature C (for example 280° C.), which reaches the boiling point at temperature D (for example 310° C.); the evaporating area is between D–E, the superheated area is between E–F, and the superheated steam is produced at temperature F (for example 450° C.). The change in temperature-heat ratio in accordance with this invention is shown in FIGURE 6, in which the conditions of the nuclear reactor inlet and outlet temperature, steam side supply water temperature, and steam, etc. are just the same as referred to in FIGURE 5, the pipe inlet temperature A of the steam generator primary side being the same as the reactor outlet temperature (corresponding to A' in FIGURE 5), the pipe outlet temperature B being the same as the reactor inlet temperature (corresponding to B' in FIGURE 5), and on the steam side all conditions are the same as in FIGURE 5. The hatched area in FIGURE 6 indicates the temperature drop in the tube wall of the primary and secondary sides, respectively. When FIGURES 5 and 6 are compared, the thermal stress in a high pressure tube on the steam side is large in the evaporating part in FIGURE 5, while it is relatively small in FIGURE 6 due to the division by the effect of the primary side, and the temperature difference between the steam tube wall and steam of the superheated part increases inversely to that in FIGURE 6. These are desired conditions and tend to produce a uniform heat flux, and make it possible to make the tubing system small on the steam side, and, thus, to make the whole apparatus compact. Moreover, FIGURE 6 indicates the capacity for producing steam is fairly good according to this invention even at the nuclear reactor coolant temperature.

The invention has been described in detail with particular reference to preferred embodiment thereof, but it will be understood that variations and modifications can be effected within the spirit and scope of the invention as described hereinabove and as defined in the appended claims.

What is claimed is:

1. An apparatus for generating steam including a steam generator comprising a vessel, a primary tubing for circulating a liquid metal through said vessel, said primary tubing being vertically positioned in the vessel, a secondary tubing for producing and heating the steam and extending through said vessel, said secondary tubing extending generally in the vertical direction, a liquid metal inlet nozzle in the upper part of the vessel for flowing radioactive liquid metal into said steam generator from a nuclear reactor, a liquid metal outlet nozzle in the lower part of the vessel for flowing the liquid metal out of the generator to the nuclear reactor, said primary tube extending between said liquid metal nozzles, a further inlet nozzle in the lower part of the vessel for flowing water or steam into the generator, a steam outlet nozzle in the upper part of the vessel for flowing steam out of the generator, the secondary tube extending between said further inlet nozzle and said steam outlet nozzle, liquid metal in said vessel surrounding said tubes and acting as a heat transmission medium between said primary and secondary tubing, a heat transmission medium inlet nozzle in said vessel for supplying said heat transmission medium into said vessel, a heat transmission medium outlet nozzle in said vessel for discharging said heat transmission medium from said vessel, a gas inlet nozzle in said vessel adjacent the top thereof for supplying an inert gas into said vessel, a gas outlet nozzle in said vessel adjacent the top thereof for exhausting the inert gas from the vessel, an inert gas being provided therein at a predetermined pressure, and a rupture disc in said vessel at a level above the highest level of the heat transmission medium, said medium and gas being effective to detect a leak in the tubing in the vessel and the level of the surface of said medium can be controlled in response to the load.

2. An apparatus as claimed in claim 1 in which said secondary tubing is helical.

3. An apparatus as claimed in claim 1 in which said secondary tubing is zigzag.

4. An apparatus as claimed in claim 1 in which said heat transmission medium is the same as that in the primary tubing.

5. An apparatus as claimed in claim 1 in which the heat transmission medium is different from that in the primary tubing.

6. An apparatus for generating steam as claimed in claim 1, further comprising a protecting tube around at least one of said primary and secondary tubing for protecting the tubing from shock in case of an explosion.

7. An apparatus for generating steam as claimed in claim 1, further comprising a compartment wall between the primary and secondary tubing for protecting the primary tubing from shock in case of explosion.

References Cited

UNITED STATES PATENTS

| | | | |
|---|---|---|---|
| 3,033,538 | 5/1962 | Iddles et al. | 122—32 |
| 3,112,735 | 12/1963 | Schlichting et al. | 122—32 |
| 3,234,412 | 2/1968 | Sankowich et al. | 176—65 XR |

KENNETH W. SPRAGUE, *Primary Examiner.*